United States Patent
Shi et al.

(10) Patent No.: US 10,950,004 B2
(45) Date of Patent: Mar. 16, 2021

(54) METHOD, APPARATUS, DEVICE AND MEDIUM FOR CALIBRATING INTELLIGENT ROADSIDE UNIT

(71) Applicant: BAIDU ONLINE NETWORK TECHNOLOGY (BEIJING) CO., LTD., Beijing (CN)

(72) Inventors: Yifeng Shi, Beijing (CN); Tian Xia, Beijing (CN); Xing Hu, Beijing (CN); Haisong Wang, Beijing (CN); Ji Tao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/554,946

(22) Filed: Aug. 29, 2019

(65) Prior Publication Data
US 2020/0074681 A1    Mar. 5, 2020

(30) Foreign Application Priority Data

Aug. 30, 2018    (CN) .......................... 201811004973.7

(51) Int. Cl.
*G06T 7/80* (2017.01)
*G01S 13/931* (2020.01)
*G05D 1/00* (2006.01)
*G06K 9/00* (2006.01)
*G05D 1/02* (2020.01)

(52) U.S. Cl.
CPC ............. *G06T 7/80* (2017.01); *G01S 13/931* (2013.01); *G05D 1/0088* (2013.01); *G05D 1/0094* (2013.01); *G05D 1/024* (2013.01); *G06K 9/00805* (2013.01); *G06T 2207/10028* (2013.01); *G06T 2207/30252* (2013.01)

(58) Field of Classification Search
CPC ............ G06T 2207/10028; G06T 2207/10044
USPC ........................................................ 348/148
See application file for complete search history.

(56) References Cited

U.S. PATENT DOCUMENTS

2008/0024607 A1* 1/2008 Ozaki ..................... G01S 17/86
                                                            348/148

FOREIGN PATENT DOCUMENTS

| CN | 107918113 A | * | 4/2018 |
| CN | 107918113 A |   | 4/2018 |
| JP | 2004212129 A |   | 7/2004 |
| JP | 2012057960 A |   | 3/2012 |

(Continued)

OTHER PUBLICATIONS

Extended European Search Report for EP Application No. 19194514.6, dated Jan. 30, 2020, 9 pages.

(Continued)

*Primary Examiner* — Amir Shahnami
(74) *Attorney, Agent, or Firm* — Fay Sharpe LLP

(57) ABSTRACT

The present disclosure proposes a method, an apparatus, a device, and a medium for calibrating an intelligent roadside unit. The method includes: obtaining an intelligent driving vehicle within a preset range of the intelligent roadside unit; obtaining a first point cloud detected by a first radar in the intelligent driving vehicle, and obtaining location information of the intelligent driving vehicle; obtaining a second point cloud detected by a second radar in the intelligent roadside unit; and obtaining location information of the second radar based on the first point cloud, the second point cloud, and the location information of the intelligent driving vehicle.

18 Claims, 4 Drawing Sheets

(56) References Cited

FOREIGN PATENT DOCUMENTS

| | | | |
|---|---|---|---|
| JP | 2016045150 | A | 4/2016 |
| JP | 2016125897 | A | 7/2016 |
| JP | 2017090239 | A | 5/2017 |

OTHER PUBLICATIONS

Office Action for Japanese Application No. 2019151837, dated May 26, 2020, 14 pages.

* cited by examiner

METHOD, APPARATUS, DEVICE AND MEDIUM FOR CALIBRATING INTELLIGENT ROADSIDE UNIT

CROSS-REFERENCE TO RELATED APPLICATIONS

This application is based upon and claims priority to Chinese Patent Application No. 201811004973.7, filed Aug. 30, 2018, the entire contents of which are incorporated herein by reference.

FIELD

The present disclosure relates to a field of positioning technologies, and more particularly, to a method, an apparatus, and a device for calibrating an intelligent roadside unit.

BACKGROUND

An intelligent roadside unit is an important support for automatic driving. With intelligent requirements for the intelligent roadside unit, it is necessary to add a variety of sensor detectors, such as a radar or a camera, on the intelligent roadside unit, to improve an active sensing ability of the intelligent roadside unit.

In the related art, a location of the intelligent roadside unit may be obtained through GPS (Global Positioning System). However, the location of the intelligent roadside unit obtained through GPS cannot meet requirements of accuracy due to high requirements of automatic driving for accuracy of a map. Furthermore, the location of intelligent roadside unit, and the location of the radar in the intelligent roadside unit both should be provided during a navigation.

SUMMARY

Embodiments of a first aspect of the present disclosure provide a method for calibrating an intelligent roadside unit. The method includes: obtaining an intelligent driving vehicle within a preset range of the intelligent roadside unit; obtaining a first point cloud detected by a first radar in the intelligent driving vehicle, and obtaining location information of the intelligent driving vehicle; obtaining a second point cloud detected by a second radar in the intelligent roadside unit; and obtaining location information of the second radar based on the first point cloud, the second point cloud, and the location information of the intelligent driving vehicle.

Embodiments of a second aspect of the present disclosure provide a computer device. The computer device includes a processor and a memory. The processor is configured to run a program corresponding to an executable program code by reading the executable program code stored in the memory, to perform the method according to the embodiments of the first aspect.

Embodiments of a third aspect of the present disclosure provide a non-transitory computer readable storage medium. The medium is configured to store computer programs that, when executed by a processor, perform the method according to the embodiments of the first aspect.

Additional aspects and advantages of the present disclosure will be given in part in the following descriptions, become apparent in part from the following descriptions, or be learned from the practice of the present disclosure.

DETAILED DESCRIPTION

Figure 1:
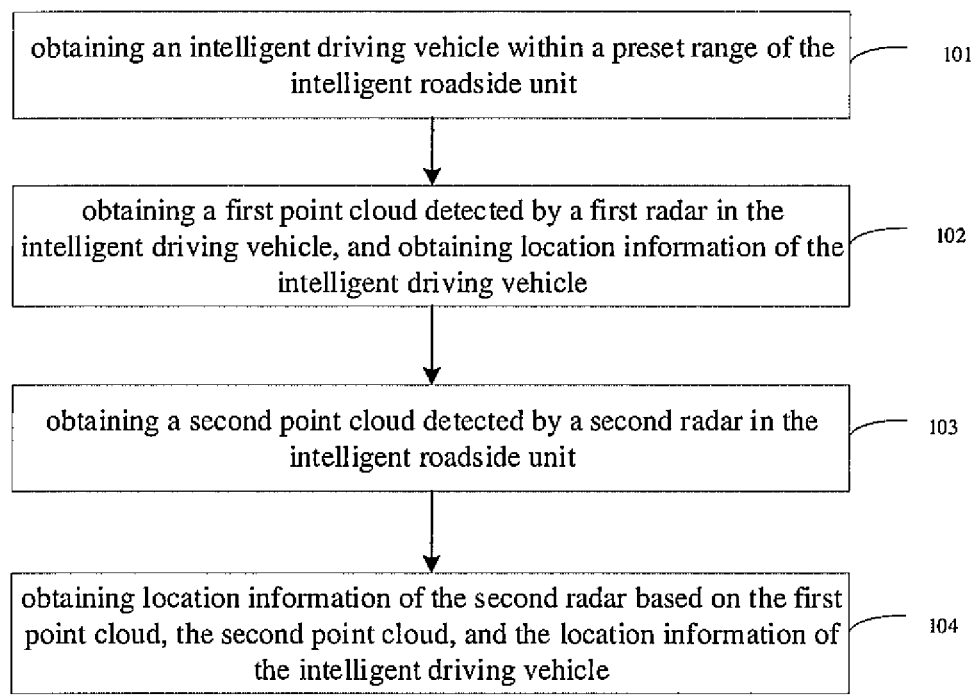
FIG. 1 is a flow chart of a method for calibrating an intelligent roadside unit according to embodiments of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

The method, the apparatus, and the device for calibrating an intelligent roadside unit will be described with reference to the drawings.

FIG. 1 is a flow chart of a method for calibrating an intelligent roadside unit according to embodiments of the present disclosure. As illustrated in FIG. 1, the method includes acts in the following blocks.

At block 101, an intelligent driving vehicle is obtained within a preset range of the intelligent roadside unit.

In the embodiment of the present disclosure, in order to calibrate a position of the intelligent roadside unit, the intelligent driving vehicle within the preset range of the intelligent roadside unit may be obtained, to determine the position of the intelligent roadside unit based on the position of the intelligent driving vehicle and a location relation between the intelligent roadside unit and the intelligent driving vehicle.

As an example, a distance sensor may be configured in the intelligent roadside unit, a distance between the intelligent driving vehicle and the intelligent roadside unit is detected by the distance sensor, and the detected distance is matched with a preset range, to obtain the intelligent driving vehicle within the preset range.

The preset range may be set as required, which is not limited here.

At block 102, a first point cloud detected by a first radar in the intelligent driving vehicle is obtained, and location information of the intelligent driving vehicle is obtained.

In an embodiment of the present disclosure, the first radar may be configured in the intelligent driving vehicle, and the first radar is configured to scan surroundings of the intelligent driving vehicle to generate the first point cloud. The first radar may be a microwave radar, an ultrasonic radar, and the like.

As a possible implementation, the location information of the intelligent driving vehicle may be obtained by a method of inertial navigation.

The location information may be either coordinate information or information of longitude and latitude, or the like.

At block 103, a second point cloud detected by a second radar in the intelligent roadside unit is obtained.

In an embodiment of the present disclosure, the second radar may be configured in the intelligent roadside unit, and the second radar is configured to scan surroundings of the intelligent roadside unit to generate the second point cloud. The second radar may be the microwave radar, the ultrasonic radar, and the like.

At block 104, location information of the second radar is obtained based on the first point cloud, the second point cloud, and the location information of the intelligent driving vehicle.

In an embodiment of the present disclosure, the location relation between the second radar and the intelligent driving vehicle may be determined based on the first point cloud and the second point cloud.

As an example, at least one feature object may be selected from the first point cloud and the second point cloud, and the second point cloud is rotated and translated until the same feature object overlaps. Then the location relation between the second radar and the intelligent driving vehicle may be determined according to a rotation angle and a translation distance.

As another example, color information may also be obtained through an image acquisition apparatus, and the color information (such as RBG value) of corresponding locations is given to the corresponding points in the first point cloud and the second point cloud, until the points with the same color information coincide. The location relation between the second radar and the intelligent driving vehicle is determined according to the rotation angle and the translation distance.

In the embodiment, the location information of the second radar may be determined based on the location relation between the second radar and the intelligent driving vehicle, and the location information of the intelligent driving vehicle. For example, the position coordinate of the intelligent driving vehicle is (1, 1), and the location relation between the second radar and the intelligent driving vehicle is (+1, −1), so the position coordinate of the second radar is (2, 0).

It is understood that, since the intelligent roadside unit is stationary, it cannot be positioned by the inertial navigation, and the accuracy of GPS positioning needs to be improved.

Figure 2:
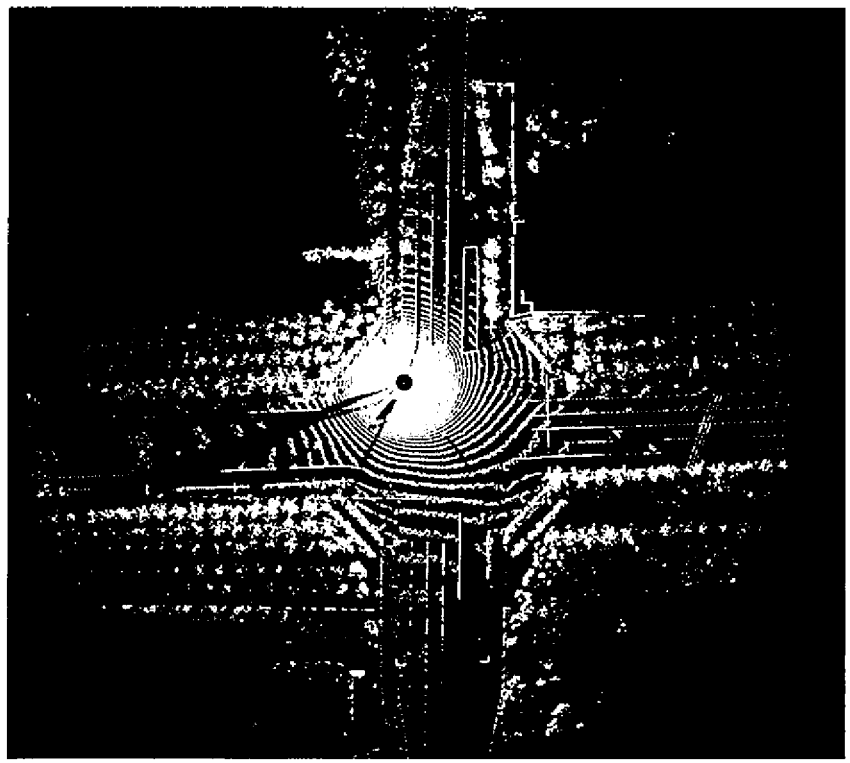
FIG. 2 is a schematic diagram of a first point cloud according to embodiments of the present disclosure.
Figure 3:
FIG. 3 is a schematic diagram of a second point cloud according to embodiments of the present disclosure.
Figure 4:
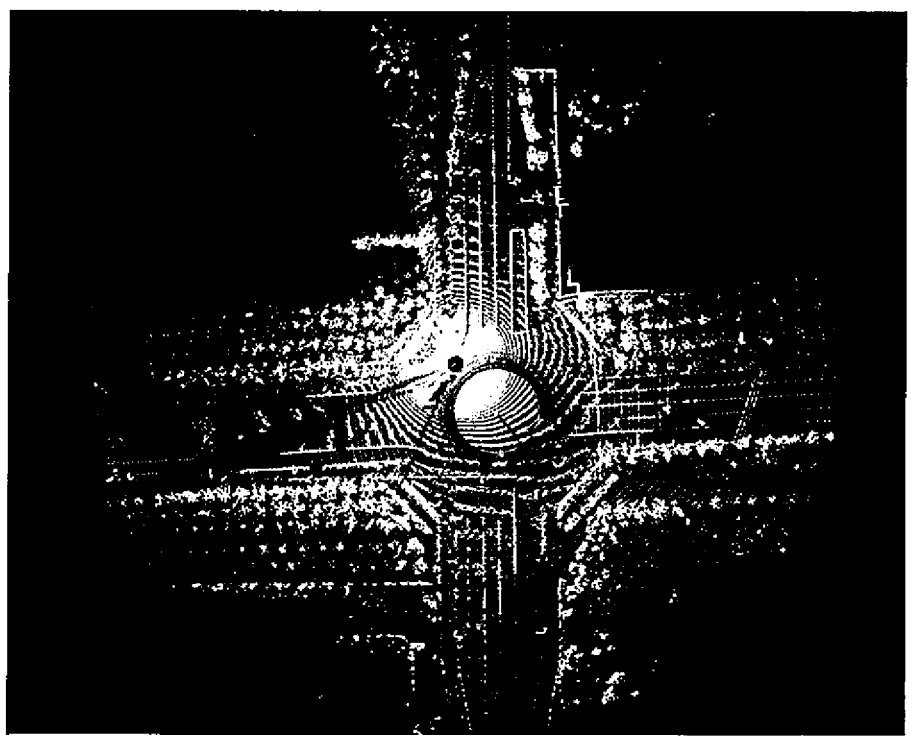
FIG. 4 is a schematic diagram of a matching and an alignment of the first point cloud and the second point cloud according to embodiments of the present disclosure.

In the embodiment, the location relation between the second radar and the intelligent driving vehicle is obtained through the point cloud. For example, taking an intersection as an example, FIG. 2 illustrates the first point cloud and FIG. 3 illustrates the second point cloud, and the matching and the alignment of the first point cloud and the second point cloud may be realized through the rotation and the translation. As illustrated in FIG. 4, the first point cloud has been matched and aligned with the second point cloud, and the location relation between the second radar and the intelligent driving vehicle is determined based on the rotation angle, and the translation orientation and distance of the point cloud.

Further, the location information of the second radar may be obtained based on the location relation and the location information of the intelligent driving vehicle, realizing the positioning of the second radar and improving the accuracy of positioning. Furthermore, the location information of the intelligent roadside unit may also be determined based on the location relation between the second radar and the intelligent roadside unit. Thus, the calibration of the intelligent roadside unit is realized, and the accuracy of positioning is improved.

With the method for calibrating an intelligent roadside unit provided in embodiments of the present disclosure, the intelligent driving vehicle within the preset range of the intelligent roadside unit is obtained firstly, and then, the first point cloud detected by the first radar in the intelligent driving vehicle and the location information of the intelligent driving vehicle are obtained. Further, the second point cloud detected by the second radar in the intelligent roadside unit is obtained, and the location information of the second radar is obtained based on the first point cloud, the second point cloud, and the location information of the intelligent driving vehicle. In the embodiment, the location relation between the second radar and the vehicle is obtained through the point cloud, and then the location information of the second radar is determined based on the location information of the intelligent driving vehicle, thereby realizing the positioning of the second radar and improving the accuracy of positioning.

Figure 5:
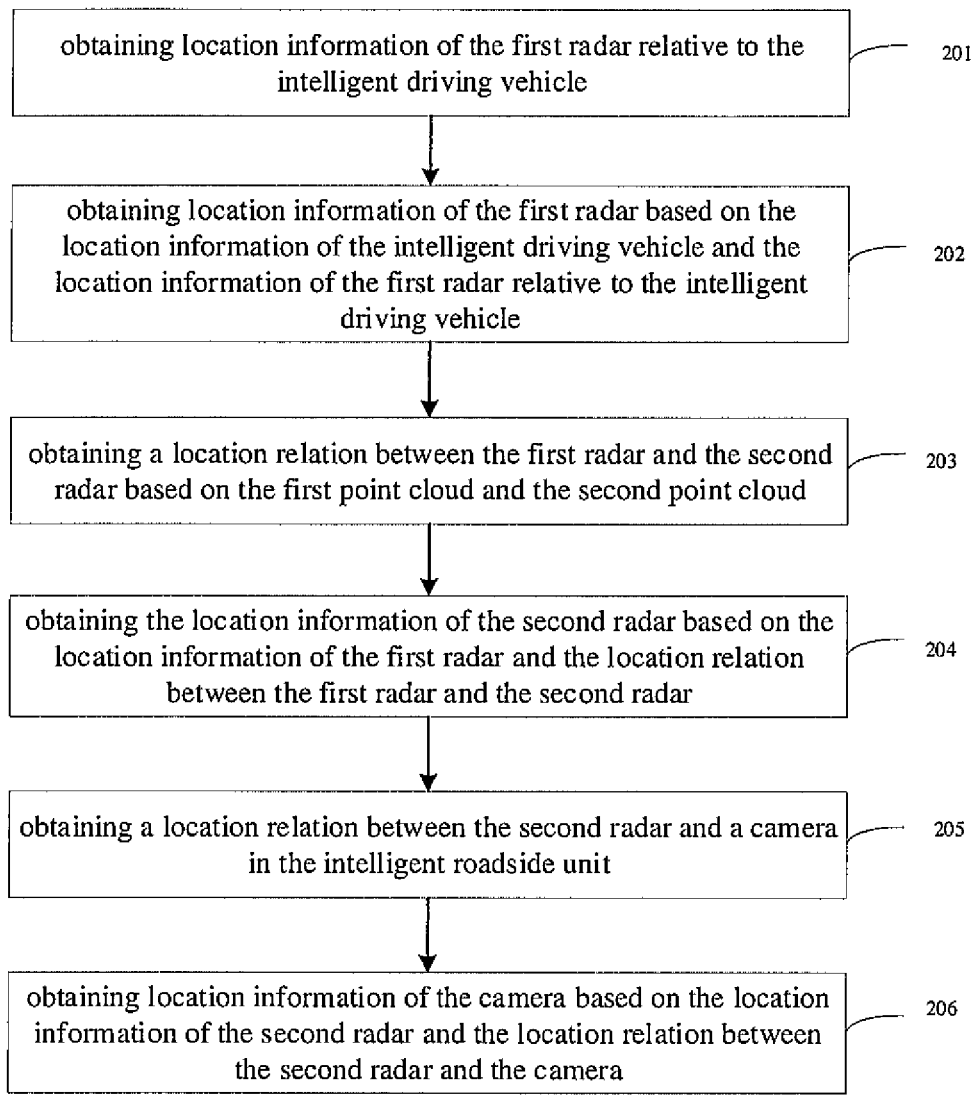
FIG. 5 is a flow chart of a method for calibrating an intelligent roadside unit according to embodiments of the present disclosure.

FIG. 5 is a flow chart of a method for calibrating an intelligent roadside unit according to embodiments of the present disclosure. As illustrated in FIG. 5, after obtaining the second point cloud, the method includes the acts in the following blocks.

At block 201, location information of the first radar relative to the intelligent driving vehicle is obtained.

At block 202, location information of the first radar is obtained based on the location information of the intelligent driving vehicle and the location information of the first radar relative to the intelligent driving vehicle.

In an embodiment of the present disclosure, a location relation between the first radar and an intermediate position of the intelligent driving vehicle may be obtained, and the location information of the first radar is obtained based on the location information of the intelligent driving vehicle and the location relation between the first radar and the intermediate position of the intelligent driving vehicle. For example, the location relation between the first radar and the intermediate position of the intelligent driving vehicle is (+1, −1), and the position coordinate of the intelligent driving vehicle is (0, 0), so the position coordinate of the first radar is (1, −1).

It is understood that, since the first point cloud is obtained through scanning by the first radar and the second point cloud is obtained through scanning by the second radar, the location relation between the first radar and the second radar may be obtained based on the first point cloud and the second point cloud. In applications, the location information of the first radar may be deviated from the location information of the intelligent driving vehicle, thus, the location information of the first radar may be obtained based on the location information of the intelligent driving vehicle and the location information of the first radar relative to the intelligent driving vehicle, so the accuracy of positioning is further improved.

As an example, the first radar may be located at the center of the first point cloud, and the second radar may be located at the center of the second point cloud. The center locations of the first point cloud and the second point cloud may be overlapped, and the point clouds may be further matched and aligned to obtain the location relation between the first radar and the second radar.

At block 203, a location relation between the first radar and the second radar is obtained based on the first point cloud and the second point cloud.

Figure 6:
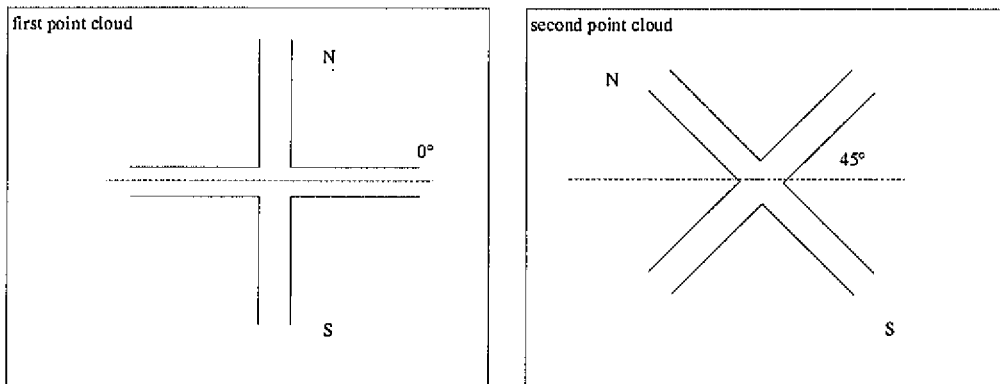
FIG. 6 is a schematic diagram of a first X-axis angle and a second X-axis angle according to embodiments of the present disclosure.

In an embodiment of the present disclosure, the first X-axis angle detected by the first radar and the second X-axis angle detected by the second radar may be obtained. Then, an initial adjustment value of the first point cloud is obtained based on the first X-axis angle and the second X-axis angle, and the first point cloud is adjusted based on the initial adjustment value. For example, an east-west direction may be used as the X-axis, the angles between the X-axis and the horizontal directions of the first point cloud and the second point cloud are obtained as the first X-axis angle and the second X-axis angle respectively. Referring to FIG. 6, the first X-axis angle is 0°, the second X-axis angle is 45°, and the initial adjustment value is 45°. Then, the image of the first point cloud is rotated counterclockwise by 45°, so that the first X-axis angle also becomes 45°.

Further, the first point cloud is rotated and translated based on a preset step size until a feature object in the first point cloud coincides with a feature object in the second point cloud, and the number of adjustments is recorded. Further, based on the initial adjustment value, the preset step size, and the number of adjustments, the location relation between the first radar and the second radar is obtained.

Taking the initial adjustment value of 0° as an example, a road line may be taken as the feature object and the preset step size is 1. After the first point cloud is shifted to the left once, the road lines coincide, so the distance between the first radar and the second radar is 1. Further, the relative direction of the first radar and the second radar may be determined based on the translation direction as well as the first X-axis angle and the second X-axis angle. Thus, the location relation between the first radar and the second radar may be determined based on the distance and the relative direction of the first radar and the second radar.

The preset step size may be obtained from a large number of experimental data or may be set according to actual needs. The coordinate system may be set according to an actual situation, which is not limited here.

In the embodiment, firstly, a rough adjustment may be performed through the initial adjustment value, and then a fine adjustment may be performed through rotation, so that the feature object in the first point cloud and the feature object in the second point cloud are closer to overlap. For example, if the first X-axis angle is 30° and the second X-axis angle is 70.5°, the first X-axis angle may be adjusted to 70° first, and the fine adjustment may be performed through rotation.

At block 204, the location information of the second radar is obtained based on the location information of the first radar and the location relation between the first radar and the second radar.

In the embodiment, the location information of the second radar may be obtained based on the location relation between the first radar and the second radar, and the location information of the first radar. For example, in the world coordinate system, the position coordinate of the first radar is (1, 1), the location relation of the first radar and the second radar is (−1, 0), then the position coordinate of the second radar is (0, 1).

At block 205, a location relation between the second radar i and a camera n the intelligent roadside unit is obtained.

At block 206, location information of the camera is obtained based on the location information of the second radar and the location relation between the second radar and the camera.

In an embodiment of the present disclosure, the location information of the camera in the intelligent roadside unit may also be obtained.

As an example, the distance and the relative direction between the second radar and the camera in the intelligent roadside unit may be measured to obtain the location relation between the second radar and the camera in the intelligent roadside unit. Further, the location information of the camera in the intelligent roadside unit is obtained based on the location information of the second radar and the location relation between the radar and the camera.

It should be noted that, the above implementation of obtaining the location information of the camera in the intelligent roadside unit is also applicable to obtaining the location information of other sensors in the intelligent roadside unit, which will not be elaborated here.

With the method for calibrating an intelligent roadside unit provided in embodiments of the present disclosure, the location relation between the second radar and the first radar is obtained through the point cloud, and the location information of the second radar is determined based on the location information of the first radar. The method realizes the calibration of intelligent roadside unit and improves the accuracy of positioning of the intelligent roadside unit. Furthermore, the method may also detect the position of other sensors in the intelligent roadside unit.

In order to achieve the above embodiments, the present disclosure further provides an apparatus for calibrating an intelligent roadside unit.

Figure 7:
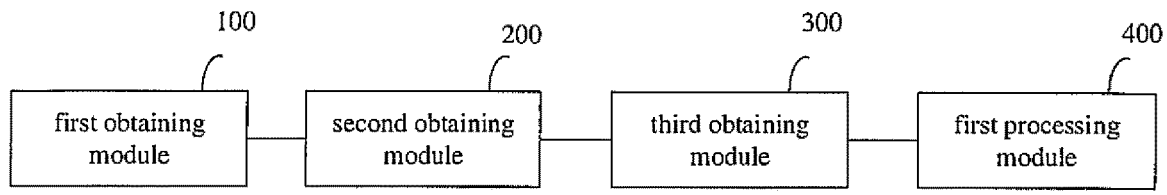
FIG. 7 is a block diagram of an apparatus for calibrating an intelligent roadside unit according to embodiments of the present disclosure.

FIG. 7 is a block diagram of an apparatus for calibrating an intelligent roadside unit according to embodiments of the present disclosure. As illustrated in FIG. 7, the apparatus includes: a first obtaining module 100, a second obtaining module 200, a third obtaining module 300 and a first processing module 400.

The first obtaining module 100 is configured to obtain an intelligent driving vehicle within a preset range of the intelligent roadside unit.

The second obtaining module 200 is configured to obtain a first point cloud detected by a first radar in the intelligent driving vehicle, and obtain location information of the intelligent driving vehicle.

The third obtaining module 300 is configured to obtain a second point cloud detected by a second radar in the intelligent roadside unit.

The first processing module 400 is configured to obtain the location information of the second radar based on the first point cloud, the second point cloud, and the location information of the intelligent driving vehicle.

Figure 8:
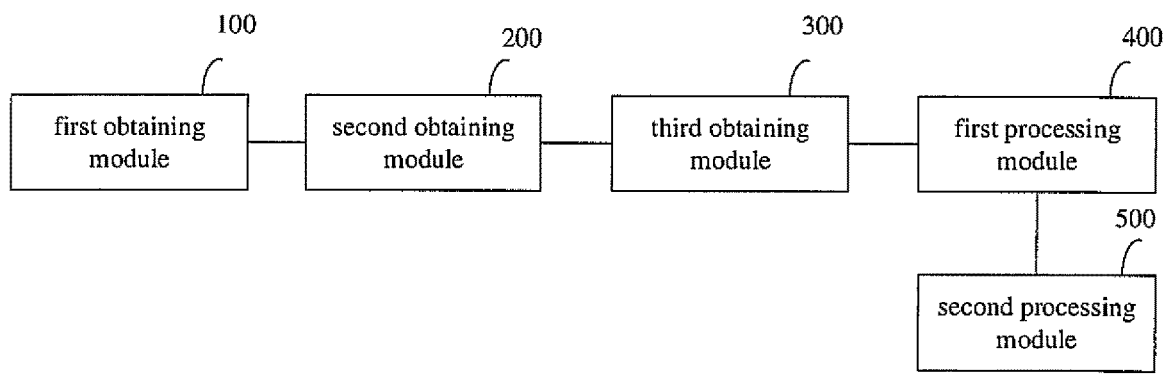
FIG. 8 is a block diagram of an apparatus for calibrating an intelligent roadside unit according to embodiments of the present disclosure.

On the basis of FIG. 7, the apparatus for calibrating an intelligent roadside unit illustrated in FIG. 8 further included a second processing module 500.

The second processing module 500 is configured to obtain a location relation between the second radar and a camera in the intelligent roadside unit; and obtain location information of the camera based on the location information of the second radar and the location relation between the second radar and the camera.

Further, the first processing module 400 is configured to: obtain location information of the first radar relative to the intelligent driving vehicle; obtain location information of the first radar based on the location information of the intelligent driving vehicle and the location information of the first radar relative to the intelligent driving vehicle; and obtain the location information of the second radar based on the first point cloud, the second point cloud, and the location information of the first radar.

Further, the first processing module 400 is configured to: obtain a location relation between the first radar and the second radar based on the first point cloud and the second point cloud; and obtain the location information of the second radar based on the location information of the first radar and the location relation between the first radar and the second radar.

Further, the first processing module 400 is configured to: obtain a first X-axis angle detected by the first radar; obtain a second X-axis angle detected by the second radar; obtain an initial adjustment value of the first point cloud based on the first X-axis angle and the second X-axis angle; adjust the first point cloud based on the initial adjustment value, and rotate and translate the first point cloud based on a preset step size until a feature object in the first point cloud coinciding with a feature object in the second point cloud, and record the number of adjustments; obtain the location relation between the first radar and the second radar based on the initial adjustment value, the preset step size, and the number of adjustments.

It should be noted that, the explanation of the above embodiments for the method for calibrating an intelligent roadside unit is also applicable to the apparatus for calibrating an intelligent roadside unit in the embodiment, which is not elaborated here.

With the apparatus for calibrating an intelligent roadside unit provided in embodiments of the present disclosure, the intelligent driving vehicle within the preset range of the intelligent roadside unit is obtained firstly, and then, the first point cloud detected by the first radar in the intelligent driving vehicle and the location information of the intelligent driving vehicle are obtained. Further, the second point cloud detected by the second radar in the intelligent roadside unit is obtained, and the location information of the second radar is obtained based on the first point cloud, the second point cloud, and the location information of the intelligent driving vehicle. In the embodiment, the location relation between the second radar and the vehicle is obtained through the point cloud, and then the location information of the second radar is determined based on the location information of the intelligent driving vehicle, thereby realizing the positioning of the second radar and improving the accuracy of positioning.

In order to achieve the above embodiments, the present disclosure further provides a computer device. The computer device includes a processor and a memory. The processor is configured to run a program corresponding to an executable program code by reading the executable program code stored in the memory, to perform the method for calibrating an intelligent roadside unit according to any one of the above embodiments.

In order to achieve the above embodiments, the present disclosure further provides a computer program product including instructions that, when executed by the processor, perform the method for calibrating an intelligent roadside unit according to any one of the above embodiments.

In order to achieve the above embodiments, the present disclosure further provides a non-transitory computer readable storage medium, stored thereon with computer programs that, when executed by the processor, perform the method for calibrating an intelligent roadside unit according to any one of the above embodiments.

Figure 9:
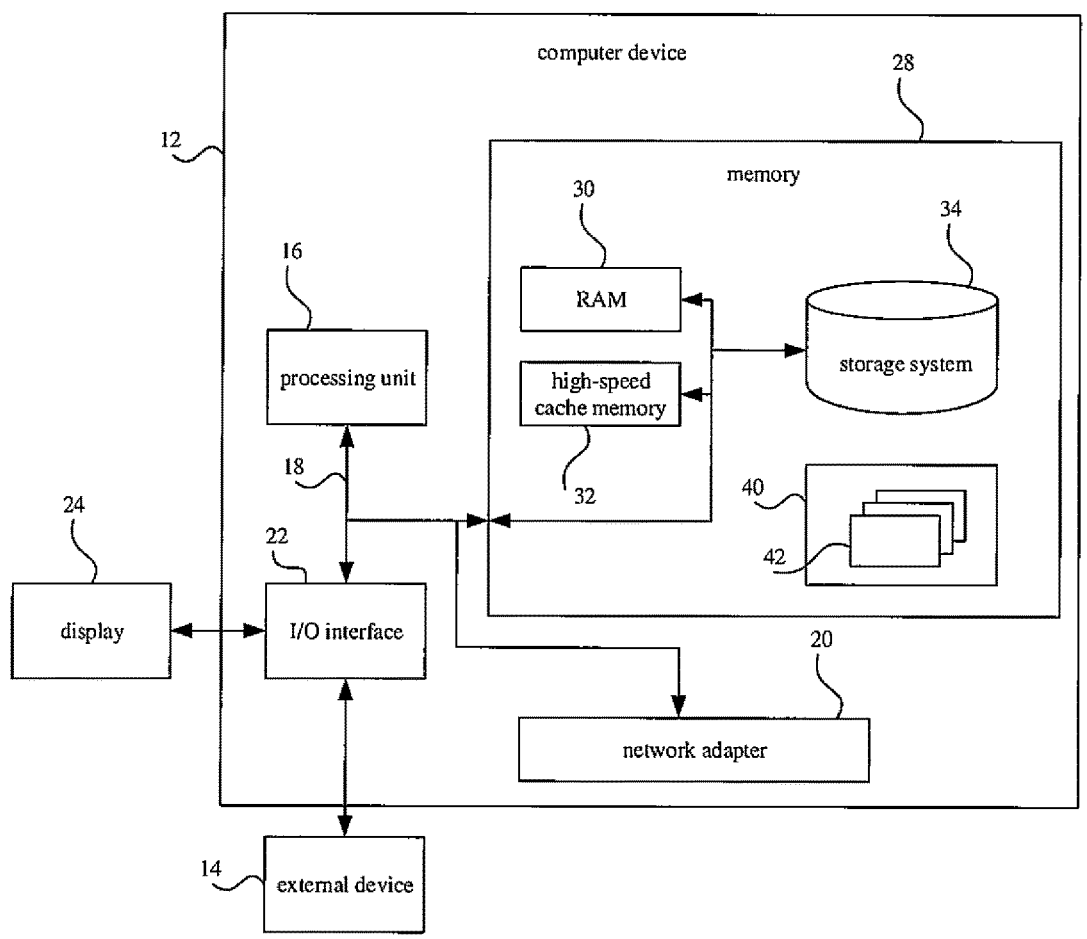
FIG. 9 is a block diagram of an exemplary computer device suitable for realizing embodiments of the present disclosure.

FIG. 9 illustrates a block diagram of an exemplary computer device 12 suitable for realizing embodiments of the present disclosure. The computer device 12 illustrated in FIG. 9 is merely an example, which should be not understood to limit the functions and usage scope of embodiments of the present disclosure.

As illustrated in FIG. 9, the computer device 12 may be represented via a general computer device form. Components of the computer device 12 may include but be not limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random-access memory (hereinafter referred to as RAM) 30 and/or a high-speed cache memory 32. The computer device 12 may further include other removable or non-removable, volatile or non-volatile computer system storage media. By way of example only, the storage system 34 may be configured to read and write a non-removable and non-volatile magnetic media (not illustrated in FIG. 9, commonly referred to as a "hard drive"). Although not illustrated in FIG. 9, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As illustrated in FIG. 9, the network adapter 20 communicates with other modules of the computer device 12 over the bus 18. It should be understood that, although not illustrated in FIG. 9, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 may perform various functional applications and data processing by running programs stored in the system memory 28, for example, to perform the method provided by embodiments of the present disclosure.

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for calibrating an intelligent roadside unit, comprising:
    obtaining by one or more computing devices, an intelligent driving vehicle within a preset range of the intelligent roadside unit by matching a distance between an intelligent driving vehicle and the intelligent roadside unit with a preset range;
    obtaining by the one or more computing devices, a first point cloud detected by a first radar in the intelligent driving vehicle;
    obtaining by the one or more computing devices, location information of the intelligent driving vehicle;
    obtaining by the one or more computing devices, a second point cloud detected by a second radar in the intelligent roadside unit; and
    obtaining by the one or more computing devices, location information of the second radar based on the first point cloud, the second point cloud, and the location information of the intelligent driving vehicle,
    wherein, the obtaining by the one or more computing devices, location information of the second radar based on the first point cloud, the second point cloud, and the location information of the intelligent driving vehicle comprises:
    matching and aligning the first point cloud with the second point cloud through rotation and translation;
    after the first point cloud has been matched and aligned with the second point cloud, determining a location relation between the second radar and the intelligent driving vehicle based on the rotation angle, and the translation orientation and distance of the point clouds; and
    obtaining the location information of the second radar based on the location relation between the second radar and the intelligent driving vehicle, and the location information of the intelligent driving vehicle.

2. The method of claim 1, further comprising:
    obtaining by the one or more computing devices, a location relation between the second radar and a camera in the intelligent roadside unit; and
    obtaining by the one or more computing devices, location information of the camera based on the location information of the second radar and the location relation between the second radar and the camera.

3. The method of claim 1, further comprising:
    obtaining by the one or more computing devices, a location relation between the second radar and the intelligent roadside unit; and
    obtaining by the one or more computing devices, location information of the intelligent roadside unit based on the location information of the second radar and the location relation between the second radar and the intelligent roadside unit.

4. The method of claim 1, wherein obtaining the location information of the second radar based on the first point cloud, the second point cloud, and the location information of the intelligent driving vehicle, comprises:
    obtaining by the one or more computing devices, location information of the first radar relative to the intelligent driving vehicle;
    obtaining by the one or more computing devices, location information of the first radar based on the location information of the intelligent driving vehicle and the location information of the first radar relative to the intelligent driving vehicle; and
    obtaining by the one or more computing devices, the location information of the second radar based on the first point cloud, the second point cloud, and the location information of the first radar.

5. The method of claim 4, wherein obtaining the location information of the second radar based on the first point cloud, the second point cloud, and the location information of the first radar, comprises:
    obtaining by the one or more computing devices, a location relation between the first radar and the second radar based on the first point cloud and the second point cloud; and
    obtaining by the one or more computing devices, the location information of the second radar based on the location information of the first radar and the location relation between the first radar and the second radar.

6. The method of claim 5, wherein obtaining the location relation between the first radar and the second radar based on the first point cloud and the second point cloud, comprises:
obtaining by the one or more computing devices, a first X-axis angle detected by the first radar;
obtaining by the one or more computing devices, a second X-axis angle detected by the second radar;
obtaining by the one or more computing devices, an initial adjustment value of the first point cloud based on the first X-axis angle and the second X-axis angle;
adjusting by the one or more computing devices, the first point cloud based on the initial adjustment value;
rotating and translating, by the one or more computing devices, the first point cloud based on a preset step size until a feature object in the first point cloud coinciding with a feature object in the second point cloud, and recording the number of adjustments; and
obtaining by the one or more computing devices, the location relation between the first radar and the second radar based on the initial adjustment value, the preset step size and the number of adjustments.

7. A computer device, comprising:
a processor and a memory;
wherein the processor is configured to run a program corresponding to an executable program code by reading the executable program code stored in the memory, to perform:
obtaining an intelligent driving vehicle within a preset range of the intelligent roadside unit by matching a distance between an intelligent driving vehicle and the intelligent roadside unit with a preset range;
obtaining a first point cloud detected by a first radar in the intelligent driving vehicle;
obtaining location information of the intelligent driving vehicle;
obtaining a second point cloud detected by a second radar in the intelligent roadside unit; and
obtaining location information of the second radar based on the first point cloud, the second point cloud, and the location information of the intelligent driving vehicle,
wherein, the obtaining by the one or more computing devices, location information of the second radar based on the first point cloud, the second point cloud, and the location information of the intelligent driving vehicle comprises:
matching and aligning the first point cloud with the second point cloud through rotation and translation;
after the first point cloud has been matched and aligned with the second point cloud, determining a location relation between the second radar and the intelligent driving vehicle based on the rotation angle, and the translation orientation and distance of the point clouds; and
obtaining the location information of the second radar based on the location relation between the second radar and the intelligent driving vehicle, and the location information of the intelligent driving vehicle.

8. The device of claim 7, wherein the processor is configured to run the program corresponding to the executable program code by reading the executable program code stored in the memory, to further perform:
obtaining a location relation between the second radar and a camera in the intelligent roadside unit; and
obtaining location information of the camera based on the location information of the second radar and the location relation between the second radar and the camera.

9. The device of claim 7, wherein the processor is configured to run the program corresponding to the executable program code by reading the executable program code stored in the memory, to further perform:
obtaining a location relation between the second radar and the intelligent roadside unit; and
obtaining location information of the intelligent roadside unit based on the location information of the second radar and the location relation between the second radar and the intelligent roadside unit.

10. The device of claim 7, wherein obtaining the location information of the second radar based on the first point cloud, the second point cloud, and the location information of the intelligent driving vehicle, comprises:
obtaining location information of the first radar relative to the intelligent driving vehicle;
obtaining location information of the first radar based on the location information of the intelligent driving vehicle and the location information of the first radar relative to the intelligent driving vehicle; and
obtaining the location information of the second radar based on the first point cloud, the second point cloud, and the location information of the first radar.

11. The device of claim 10, wherein obtaining the location information of the second radar based on the first point cloud, the second point cloud, and the location information of the first radar, comprises:
obtaining a location relation between the first radar and the second radar based on the first point cloud and the second point cloud; and
obtaining the location information of the second radar based on the location information of the first radar and the location relation between the first radar and the second radar.

12. The device of claim 11, wherein obtaining the location relation between the first radar and the second radar based on the first point cloud and the second point cloud, comprises:
obtaining a first X-axis angle detected by the first radar;
obtaining a second X-axis angle detected by the second radar;
obtaining an initial adjustment value of the first point cloud based on the first X-axis angle and the second X-axis angle;
adjusting the first point cloud based on the initial adjustment value;
rotating and translating the first point cloud based on a preset step size until a feature object in the first point cloud coinciding with a feature object in the second point cloud, and recording the number of adjustments; and
obtaining the location relation between the first radar and the second radar based on the initial adjustment value, the preset step size and the number of adjustments.

13. A non-transitory computer readable storage medium, configured to store computer programs that, when executed by a processor, perform a method comprising:
obtaining an intelligent driving vehicle within a preset range of the intelligent roadside unit by matching a distance between an intelligent driving vehicle and the intelligent roadside unit with a preset range;
obtaining a first point cloud detected by a first radar in the intelligent driving vehicle;
obtaining location information of the intelligent driving vehicle;

obtaining a second point cloud detected by a second radar in the intelligent roadside unit; and obtaining location information of the second radar based on the first point cloud, the second point cloud, and the location information of the intelligent driving vehicle, wherein, the obtaining by the one or more computing devices, location information of the second radar based on the first point cloud, the second point cloud, and the location information of the intelligent driving vehicle comprises:

matching and aligning the first point cloud with the second point cloud through rotation and translation;

after the first point cloud has been matched and aligned with the second point cloud, determining a location relation between the second radar and the intelligent driving vehicle based on the rotation angle, and the translation orientation and distance of the point clouds; and obtaining the location information of the second radar based on the location relation between the second radar and the intelligent driving vehicle, and the location information of the intelligent driving vehicle.

14. The non-transitory computer readable storage medium of claim 13, wherein the method further comprises:
obtaining a location relation between the second radar and a camera in the intelligent roadside unit; and
obtaining location information of the camera based on the location information of the second radar and the location relation between the second radar and the camera.

15. The non-transitory computer readable storage medium of claim 13, wherein the method further comprises:
obtaining a location relation between the second radar and the intelligent roadside unit; and
obtaining location information of the intelligent roadside unit based on the location information of the second radar and the location relation between the second radar and the intelligent roadside unit.

16. The non-transitory computer readable storage medium of claim 13, wherein obtaining the location information of the second radar based on the first point cloud, the second point cloud, and the location information of the intelligent driving vehicle, comprises:

obtaining location information of the first radar relative to the intelligent driving vehicle;
obtaining location information of the first radar based on the location information of the intelligent driving vehicle and the location information of the first radar relative to the intelligent driving vehicle; and
obtaining the location information of the second radar based on the first point cloud, the second point cloud, and the location information of the first radar.

17. The non-transitory computer readable storage medium of claim 16, wherein obtaining the location information of the second radar based on the first point cloud, the second point cloud, and the location information of the first radar, comprises:
obtaining a location relation between the first radar and the second radar based on the first point cloud and the second point cloud; and
obtaining the location information of the second radar based on the location information of the first radar and the location relation between the first radar and the second radar.

18. The non-transitory computer readable storage medium of claim 17, wherein obtaining the location relation between the first radar and the second radar based on the first point cloud and the second point cloud, comprises:
obtaining a first X-axis angle detected by the first radar;
obtaining a second X-axis angle detected by the second radar;
obtaining an initial adjustment value of the first point cloud based on the first X-axis angle and the second X-axis angle;
adjusting the first point cloud based on the initial adjustment value;
rotating and translating the first point cloud based on a preset step size until a feature object in the first point cloud coinciding with a feature object in the second point cloud, and recording the number of adjustments; and
obtaining the location relation between the first radar and the second radar based on the initial adjustment value, the preset step size and the number of adjustments.

* * * * *